(12) United States Patent
Kamada et al.

(10) Patent No.: US 10,260,472 B2
(45) Date of Patent: Apr. 16, 2019

(54) CONTROL DEVICE FOR VEHICLE AND CONTROL METHOD FOR VEHICLE

(71) Applicants: TOYOTA JIDOSHA KABUSHIKI KAISHA, Toyota-shi, Aichi-ken (JP); DENSO CORPORATION, Kariya, Aichi-pref. (JP)

(72) Inventors: Atsushi Kamada, Miyoshi (JP); Yusaku Kawaguchi, Nagoya (JP)

(73) Assignees: TOYOTA JIDOSHA KABUSHIKI KAISHA, Toyota (JP); DENSO CORPORATION, Kariya (JP)

( * ) Notice: Subject to any disclaimer, the term of this patent is extended or adjusted under 35 U.S.C. 154(b) by 29 days.

(21) Appl. No.: 15/782,434

(22) Filed: Oct. 12, 2017

(65) Prior Publication Data
US 2018/0149129 A1 May 31, 2018

(30) Foreign Application Priority Data

Nov. 25, 2016 (JP) ................. 2016-229579

(51) Int. Cl.
| | |
|---|---|
| *F02N 11/08* | (2006.01) |
| *F16H 61/32* | (2006.01) |
| *F16H 63/34* | (2006.01) |
| *F16H 63/50* | (2006.01) |
| *F16H 61/28* | (2006.01) |
| *F16H 61/00* | (2006.01) |

(52) U.S. Cl.
CPC ......... *F02N 11/0818* (2013.01); *F16H 61/28* (2013.01); *F16H 61/32* (2013.01); *F16H 63/3458* (2013.01); *F16H 63/50* (2013.01); *F16H 2061/005* (2013.01); *F16H 2061/2823* (2013.01); *F16H 2061/326* (2013.01)

(58) Field of Classification Search
None
See application file for complete search history.

(56) References Cited

U.S. PATENT DOCUMENTS

| | | | | |
|---|---|---|---|---|
| 6,712,736 | B2 * | 3/2004 | Scarlata | ......... B60R 25/04 477/102 |
| 8,075,447 | B2 * | 12/2011 | Hori | ......... F02N 11/0803 477/101 |
| 8,494,734 | B2 * | 7/2013 | Ueno | ......... F16H 61/12 701/58 |
| 9,506,443 | B2 * | 11/2016 | Morise | ......... F02N 11/003 |
| 9,957,943 | B2 * | 5/2018 | Lundberg | ......... F02N 11/103 |

FOREIGN PATENT DOCUMENTS

JP        2010-173607 A        8/2010

\* cited by examiner

*Primary Examiner* — Dirk Wright
(74) *Attorney, Agent, or Firm* — Oliff PLC

(57) ABSTRACT

In a case where an operation to a non-parking operation position is performed at the time when an engine stops at a parking position, an electronic control unit executes two controls, i.e., a change to a non-parking position and starting of the engine, simultaneously. At this time, in a case where the operation to the non-parking operation position is performed at the time when the engine is stopped at the parking position by stop-start system, a deceleration start timing of an electric actuator is made earlier in comparison with a case where the operation is performed at a time different from the above. Accordingly, even in a state where a voltage of the electric actuator is decreased, a motor rotation position can be easily stopped at a non-p target rotation position.

5 Claims, 6 Drawing Sheets

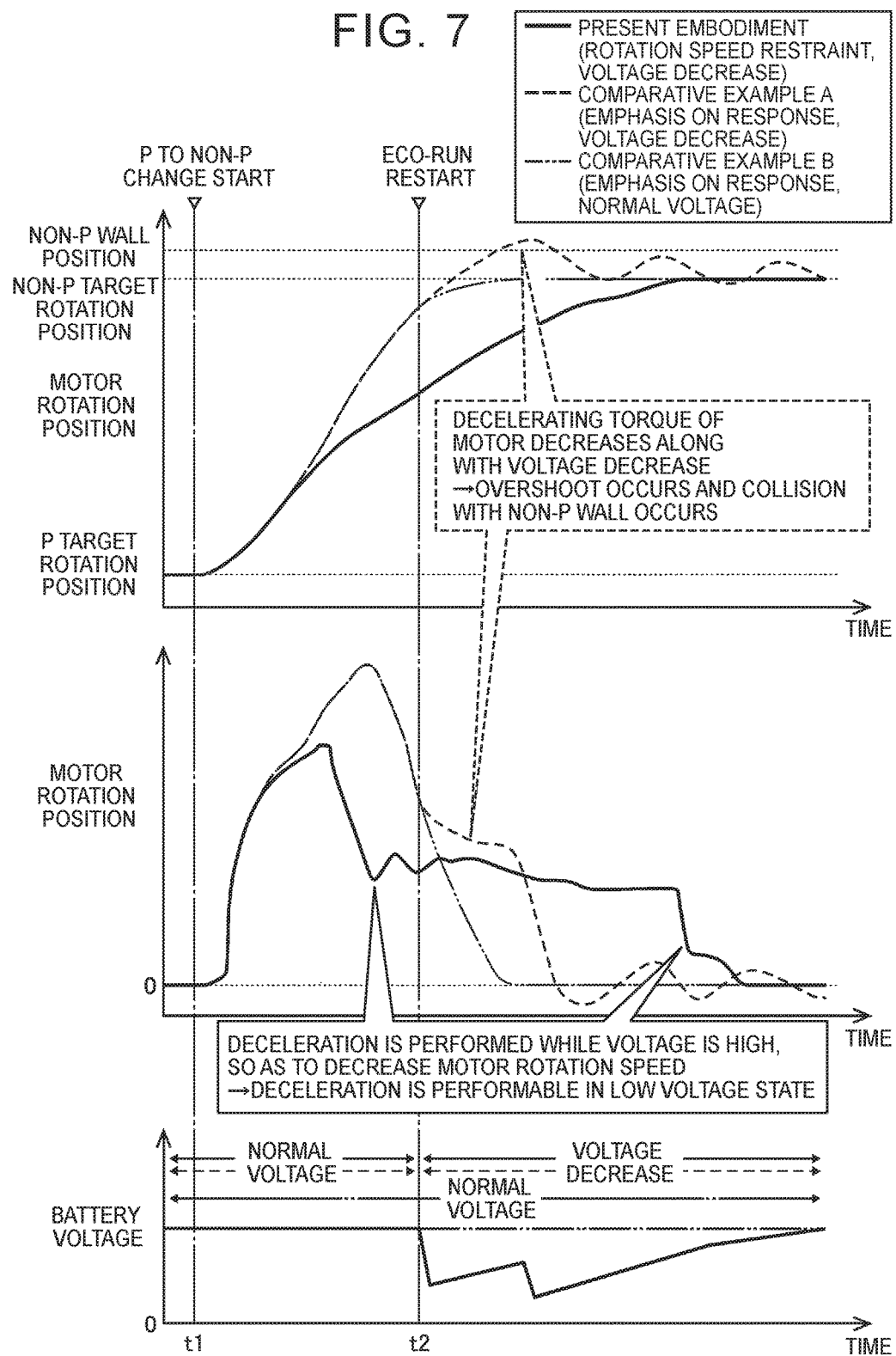

CONTROL DEVICE FOR VEHICLE AND CONTROL METHOD FOR VEHICLE

INCORPORATION BY REFERENCE

The disclosure of Japanese Patent Application No. 2016-229579 filed on Nov. 25, 2016 including the specification, drawings and abstract is incorporated herein by reference in its entirety.

BACKGROUND

1. Technical Field

The present disclosure relates to a control device for a vehicle and a control method for a vehicle, each of which changes a shift position of an automatic transmission by an operation of an electric actuator based on an operation position of a manual operating device.

2. Description of Related Art

In terms of a vehicle including an engine, an automatic transmission for transmitting a power of the engine to driving wheels, a manual operating device including an operator operated by a driver to an operation position corresponding to a shift position of the automatic transmission, and a change mechanism for changing the shift position of the automatic transmission by an operation of an electric actuator, there has been known a control device for the vehicle, the control device being configured to electrically change the shift position of the automatic transmission by the change mechanism based on the operation position. As an example, there is a vehicle control system described in Japanese Patent Application Publication No. 2010-173607 (JP 2010-173607 A). JP 2010-173607 A discloses the following: at the time of an engine stop, a vehicle stop, and braking of a vehicle by a foot brake (that is, a wheel brake) in a parking range (the range has the same meaning as a position) in an automatic transmission, starting (cranking) of the engine is started first in response to a manual operation to a drive range position corresponding to a travel range in the automatic transmission, and after the engine is started, the automatic transmission is changed to the travel range.

SUMMARY

In the meantime, when the driver performs an operation to a given operation position, it is desired that a control corresponding to the operation be completed immediately. Like the control disclosed in JP 2010-173607 A, in a case of sequentially performing two controls, i.e., a control to change the shift position of the automatic transmission from a parking position to a non-parking position and a control to start the engine at the time when the driver performs an operation to a non-parking operation position, it takes much time from the operation to the non-parking operation position by the driver until the two controls are actually completed. Accordingly, responses of the two controls to the operation to the non-parking operation position may decrease. In this regard, if the two controls are performed together simultaneously, a voltage to be applied to an electric actuator that changes the shift position of the automatic transmission decreases due to a decrease in a battery voltage along with the cranking of the engine by an electric starting device. Accordingly, the electric actuator might not be operated in a similar manner to a time when the battery voltage does not decrease. For example, there might occur an overshoot in which the operation position of the electric actuator is beyond its target operation position because the electric actuator cannot be stopped appropriately at the target operation position after the change of the shift position.

The present disclosure secures responses of two controls to an operation to a non-parking operation position by a driver by simultaneously executing the two controls, i.e., a change of an automatic transmission to a non-parking position and starting of an engine, and restrains an overshoot of an electric actuator with respect to a target operation position.

A first aspect of the present disclosure relates to a control device for a vehicle. The vehicle includes an engine, an automatic transmission, an operating device, a change mechanism, an electric starting device, and an electronic control unit. The automatic transmission is configured to transmit a power of the engine to driving wheels. The operating device includes operators. The operators are configured to be operated by a driver to an operation position corresponding to a shift position of the automatic transmission. The change mechanism is configured to change the shift position of the automatic transmission by an operation of an electric actuator. The electric starting device is configured to start the engine by cranking. The electronic control unit is configured to electrically change the shift position of the automatic transmission by the change mechanism based on the operation position of the operators. The electronic control unit is configured to start the engine by cranking by the electric starting device when the electronic control unit determines that the operators are operated by the driver to a non-parking operation position at a predetermined time. The predetermined time is a time when the shift position of the automatic transmission is set to a parking position and the engine stops. The parking position is the shift position of the automatic transmission. The shift position causing a parking lock state where rotation of an output rotational member of the automatic transmission is mechanically prevented by the change mechanism. The non-parking operation position is a position of the operator corresponding to a non-parking position of the automatic transmission. The non-parking position is the shift position of the automatic transmission at which the parking lock state is released. The electronic control unit is configured to control a deceleration start timing of the electric actuator such that the deceleration start timing of a first condition becomes earlier than the deceleration start timing of a second condition. The first condition is a condition under which the operator is operated by the driver to the non-parking operation position at the predetermined time. The second condition is a condition under which the operator is operated by the driver to the non-parking operation position at a time other than the predetermined time.

With the above configuration, in a case where the operation to the non-parking operation position is performed at the time when the engine stops at the parking position of the automatic transmission, two controls, i.e., the change of the automatic transmission from the parking position to the non-parking position and the starting of the engine, are executed simultaneously. At this time, in a case where the operation to the non-parking operation position is performed at the time when the engine stops at the parking position, the deceleration start timing of the electric actuator operated so as to change the automatic transmission from the parking position to the non-parking position is made earlier in comparison with a case where the operation is performed at a time different from the time when the engine stops at the parking position. Accordingly, even in a state where the voltage applied to the electric actuator is decreased, the operation position of the electric actuator can be easily stopped at a target operation position after the change of the shift position. Therefore, it is possible to secure responses of the two controls to the operation to the non-parking operation position by the driver by simultaneously executing the two controls, i.e., the change of the automatic transmission to the non-parking position and the starting of the engine, and it is also possible to restrain an overshoot of the electric actuator with respect to the target operation position.

In the control device for the vehicle, the electronic control unit may be configured to operate the electric actuator by use of a predetermined relationship such that a first predetermined working amount is larger than a second predetermined working amount. The first predetermined working amount may be a predetermined working amount at a time when a voltage applied to the electric actuator is lower than a predetermined voltage. The second predetermined working amount may be a predetermined working amount at a time when the voltage applied to the electric actuator is higher than the predetermined voltage. The predetermined working amount may be a remaining working amount to a working amount corresponding to a target operation position of the electric actuator after the shift position is changed, so as to determine an operation position to start deceleration of the electric actuator. The electronic control unit may be configured to operate the electric actuator by use of the predetermined working amount in the predetermined relationship such that the deceleration start timing of the electric actuator is made early when the electronic control unit (90) determines the voltage applied to the electric actuator is lower than the predetermined voltage.

With the above configuration, in a case where the operation to the non-parking operation position is performed at the time when the engine stops at the parking position, the electric actuator is operated by use of a remaining working amount at the time when the voltage applied to the electric actuator is lower than the predetermined voltage such that the deceleration start timing of the electric actuator operated to change the automatic transmission to the non-parking position is made earlier. Accordingly, even in a state where the voltage applied to the electric actuator is decreased, the operation position of the electric actuator can be easily stopped at the target operation position after the change of the shift position appropriately.

In the control device for the vehicle, the operation to the non-parking operation position may be an operation to a travel operation position in which the shift position of the automatic transmission is set to a travel position. The travel position may be the shift position of the automatic transmission at which the power of the engine is transmitted to the driving wheels.

With the above configuration, the operation to the non-parking operation position is an operation to a travel operation position corresponding to a travel position of the automatic transmission. Accordingly, it is possible to secure the responses of the two controls to the operation to the travel operation position by the driver by simultaneously executing the two controls, i.e., the change of the automatic transmission to the travel position and the starting of the engine, and it is also possible to restrain an overshoot of the electric actuator with respect to the target operation position. Since the responses of the two controls are secured, a start response can be secured, for example.

In the control device for the vehicle, the electronic control unit may be configured to execute an idle reduction control, and the idle reduction control may be a control to temporarily stop the engine based on a predetermined engine stop condition. The predetermined time may be a time when the engine stops due to the idle reduction control.

With the above configuration, the time when the engine stops at the parking position is the time when the engine stops at the parking position due to the idle reduction control. Accordingly, in a case where the engine is temporarily stopped at the parking position due to the idle reduction control, the starting of the engine is executed by the operation to the non-parking operation position.

A second aspect of the present disclosure is a control method for a vehicle. The vehicle includes an engine, an automatic transmission, an operating device, a change mechanism, an electric starting device, and an electronic control unit. The automatic transmission is configured to transmit a power of the engine to driving wheels. The operating device includes operators. The operators are configured to be operated by a driver to an operation position corresponding to a shift position of the automatic transmission. The change mechanism is configured to change the shift position of the automatic transmission by an operation of an electric actuator. The electric starting device is configured to start the engine by cranking. The method includes: electrically changing, by the electronic control unit, the shift position of the automatic transmission based on the operation position of the operators; starting, by the electronic control unit, the engine by cranking by the electric starting device when the electronic control unit determines that an operation to a non-parking operation position is performed by the driver at a predetermined time; and controlling, by the electronic control unit, a deceleration start timing of the electric actuator such that the deceleration start timing of a first condition becomes earlier than the deceleration start timing of a second condition. The predetermined time is a time when the shift position of the automatic transmission is set to a parking position and the engine stops. The parking position is the shift position of the automatic transmission. The shift position causing a parking lock state where rotation of an output rotational member of the automatic transmission is mechanically prevented by the change mechanism. The non-parking operation position is a position of the operator corresponding to a non-parking position of the automatic transmission. The non-parking position is the shift position of the automatic transmission at which the parking lock state is released. The first condition is a condition under which the operator is operated by the driver to the non-parking operation position at the predetermined time. The second condition is a condition under which the operator is operated by the driver to the non-parking operation position at a time other than the predetermined time.

With the above configuration, in a case where the operation to the non-parking operation position is performed at the time when the engine stops at the parking position of the automatic transmission, two controls, i.e., the change of the automatic transmission from the parking position to the non-parking position and the starting of the engine, are executed simultaneously. At this time, in a case where the operation to the non-parking operation position is performed at the time when the engine stops at the parking position, the deceleration start timing of the electric actuator operated so as to change the automatic transmission from the parking position to the non-parking position is made earlier in comparison with a case where the operation is performed at a time different from the time when the engine stops at the parking position. Accordingly, even in a state where the voltage applied to the electric actuator is decreased, the operation position of the electric actuator can be easily stopped at a target operation position after the change of the shift position. Therefore, it is possible to secure responses of the two controls to the operation to the non-parking operation position by the driver by simultaneously executing the two controls, i.e., the change of the automatic transmission to the non-parking position and the starting of the engine, and it is also possible to restrain an overshoot of the electric actuator with respect to the target operation position.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 7 is a view illustrating one example of a time chart when the control operation illustrated in the flowchart of FIG. 6 is executed.

DETAILED DESCRIPTION OF EMBODIMENTS

An embodiment of the present disclosure will hereinafter be described in detail with reference to the drawings.

Figure 1:
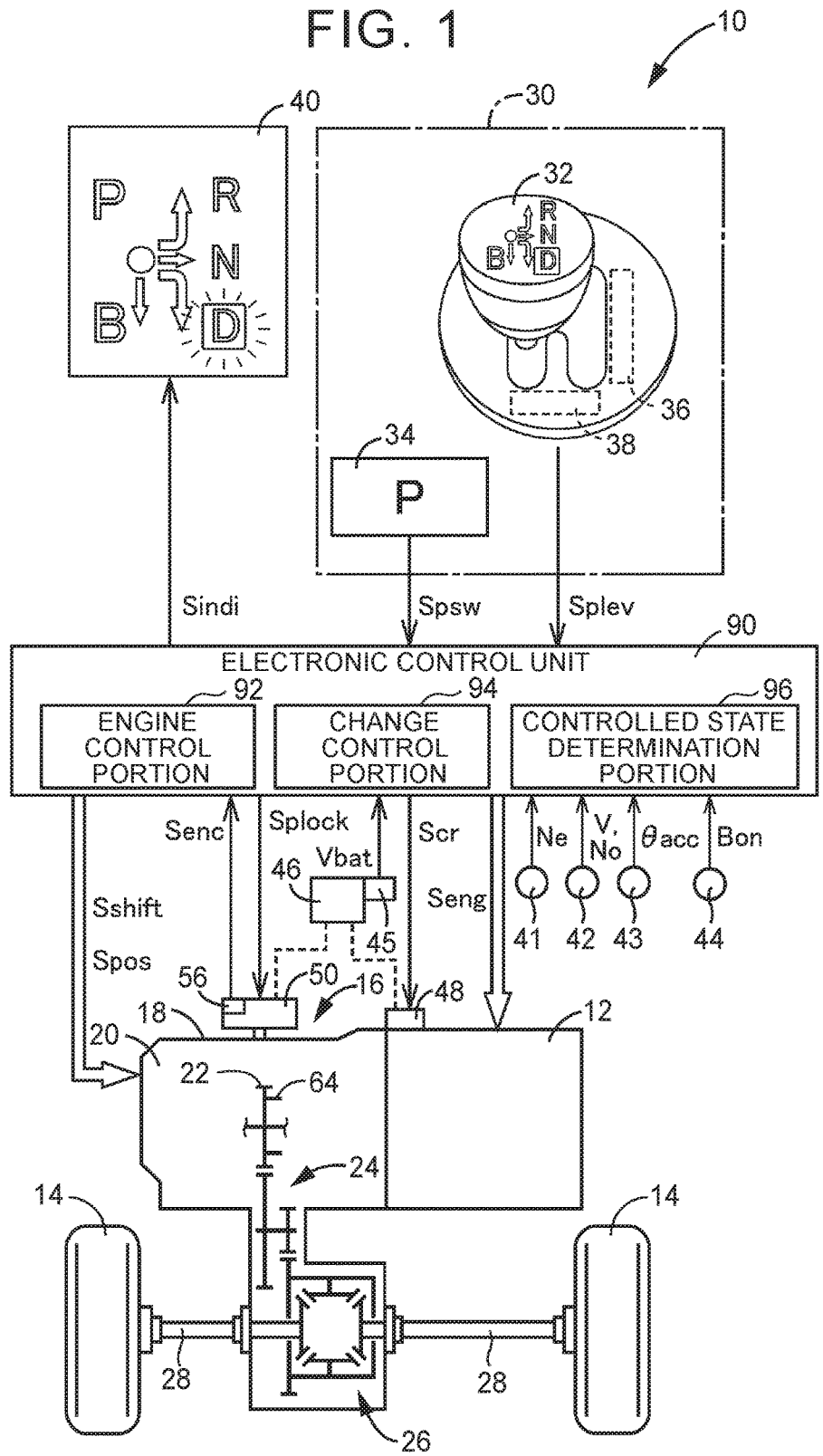
FIG. 1 is a view to describe a schematic configuration of a vehicle to which the present disclosure is applied and is also a view to describe an essential part of a control system and a control function for various controls in the vehicle.

FIG. 1 is a view to describe a schematic configuration of a vehicle 10 to which the present disclosure is applied and is also a view to describe an essential part of a control system and a control function for various controls in the vehicle 10. In FIG. 1, the vehicle 10 includes an engine 12, driving wheels 14, and a power transmission device 16 provided in a power transmission path between the engine 12 and the driving wheels 14. The power transmission device 16 includes, inside a case 18 as a nonrotatable member attached to a vehicle body, an automatic transmission 20 for transmitting a power of the engine 12 to the driving wheels 14, a reduction gear mechanism 24 connected to an output gear 22, which is an output rotational member of the automatic transmission 20, a differential gear (a differential gear mechanism) 26 connected to the reduction gear mechanism 24, and so on. Further, the power transmission device 16 includes a pair of drive shafts (axles) 28 connected to the differential gear 26, and so on. In the power transmission device 16, a power (the same meaning as a torque and a force when not distinguished particularly) which is output from the engine 12 is transmitted to the driving wheels 14 sequentially via the automatic transmission 20, the reduction gear mechanism 24, the differential gear 26, the drive shafts 28, etc. Moreover, the vehicle 10 further includes a manual operating device 30, an indicator 40, a change mechanism 50, and so on. In the vehicle 10, a shift position (the same meaning as a shift range) of the automatic transmission 20 is changed by use of a shift-by-wire (SBW) method.

The manual operating device 30 is a shift operation device for performing selection from several types of shift positions in the automatic transmission 20 by a manual operation (that is, a shift operation device that is manually operated so as to receive a change request of the shift position of the automatic transmission 20). The manual operating device 30 is disposed near a driver seat, for example, and includes operators selectively operated by a driver to a plurality of operation positions corresponding to the plurality of shift positions of the automatic transmission 20. The operators are a shift lever 32 and a parking switch 34, for example. An operation position of the shift lever 32 is a lever position Plev, and an operation position of the parking switch 34 is a parking switch-on position Psw. The shift lever 32 and the parking switch 34 are both a momentary-type operator returned to an original position (an initial position) in a state where an external force is not applied, that is, an operator returned to the initial position when it is not operated by the driver (in other words, an automatic return operator that automatically returns to the initial position when an operation force is released). The shift lever 32 is alternatively operated into a lever position Plev corresponding to a desired shift position by the driver in order to set the shift position of the automatic transmission 20 to the desired shift position from among a plurality of non-parking positions (hereinafter referred to as "non-P positions") other than a parking position (hereinafter referred to as a "P position"). The non-P positions are an R position, an N position, and a D position, for example. The parking switch 34 is an operator provided as another switch near the shift lever 32, and is operated by the driver in order to set the shift position of the automatic transmission 20 to the P position.

The lever position Plev of the shift lever 32 includes an R operation position, an N operation position, a D operation position, an H operation position, and a B operation position. The H operation position is an initial position (a home position) of the shift lever 32. Even if the shift lever 32 is operated to a lever position Plev (R, N, D, B operation position) other than the H operation position, when the driver releases the shift lever 32 (that is, an external force applied to the shift lever 32 is released), the shift lever 32 is returned to the H operation position by a mechanical mechanism such as a spring. The manual operating device 30 includes a shift sensor 36 and a select sensor 38, which are position sensors for detecting the lever position Plev of the shift lever 32, and outputs output voltages of the position sensors as lever position signals Splev corresponding to the lever position Plev to the after-mentioned electronic control unit 90. The electronic control unit 90 recognizes (determines) the lever position Plev based on the output voltages of the position sensors as the lever position signals Splev.

The parking switch 34 is, for example, a momentary-type push button switch, and is pushed, by the driver, to a parking operation position (hereinafter referred to as a "P operation position"), which is a parking switch-on position Psw. In a state where the parking switch 34 is not pushed, the parking switch 34 is placed at its initial position (a home position). Even if the parking switch 34 is pushed to the parking switch-on position Psw, when the driver releases the parking switch 34, the parking switch 34 is returned to the initial position by a mechanical mechanism such as a spring. Every time the parking switch 34 is pushed to the P operation position, a parking switch signal Spsw corresponding to the parking switch-on position Psw is output to the aftermentioned electronic control unit 90.

The P operation position is an operation position corresponding to the P position of the automatic transmission 20, and an operation position to select (or request) the P position of the automatic transmission 20. The P position of the automatic transmission 20 is a park position at which the power transmission path in the automatic transmission 20 is interrupted (that is, the power transmission path between the engine 12 and the driving wheels 14 is in a neutral state in which a power is not transmittable) and a parking lock (also referred to as a "P lock") state in which rotation of the output gear 22 of the automatic transmission 20 is mechanically prevented (locked) is established by the change mechanism 50. The R operation position is a reverse travel operation position corresponding to the R position of the automatic transmission 20, and an operation position to select (or request) the R position of the automatic transmission 20. The R position of the automatic transmission 20 is a reverse travel position at which the power transmission path in the automatic transmission 20 is in a power transmittable state where a power for reverse traveling is transmittable (that is, a power transmission path for reverse traveling is formed in the power transmission path between the engine 12 and the driving wheels 14). Further, the N operation position is a neutral operation position corresponding to the N position of the automatic transmission 20, and an operation position to select (or request) the N position of the automatic transmission 20. The N position of the automatic transmission 20 is a neutral position at which the power transmission path in the automatic transmission 20 is interrupted (that is, the power transmission path between the engine 12 and the driving wheels 14 enters a neutral state where the power is not transmittable). Further, the D operation position is a forward travel operation position corresponding to the D position of the automatic transmission 20, and an operation position to select (or request) the D position of the automatic transmission 20. The D position of the automatic transmission 20 is a forward travel position at which the power transmission path in the automatic transmission 20 is in a power transmittable state where a power for forward traveling is transmittable (that is, a power transmission path for forward traveling is formed in the power transmission path between the engine 12 and the driving wheels 14). Further, the B operation position is an engine brake operation position corresponding to the B position of the automatic transmission 20, and an operation position to select (or request) the B position of the automatic transmission 20. The B position of the automatic transmission 20 is a deceleration forward travel position (an engine brake position) entering a state (a state where an engine brake effect is more strongly provided) where engine brake using the engine 12 more easily works than the D position, in a power transmittable state where the power transmission path for forward traveling is formed at the D position.

The R position, the N position, the D position, and the B position of the automatic transmission 20 are respective non-P positions of the automatic transmission 20 where the P lock state is released. The R operation position, the N operation position, the D operation position, and the B operation position are respective non-parking operation positions (also referred to as "non-P operation positions") corresponding to the non-P positions of the automatic transmission 20. The P position and the N position of the automatic transmission 20 are non-travel positions (that is, non-travel positions that prohibit traveling by the power of the engine 12) at which the power of the engine 12 is non-transmittable to the driving wheels 14. The P operation position and the N operation position are respective non-travel operation positions corresponding to respective non-travel positions of the automatic transmission 20. The R position, the D position, and the B position of the automatic transmission 20 are each a travel position (that is, a travel position that allows traveling by the power of the engine 12) where the power of the engine 12 is transmittable to the driving wheels 14. The R operation position, the D operation position, and the B operation position are respective travel operation positions corresponding to respective travel positions of the automatic transmission 20.

The indicator 40 is provided at an easily viewable position from the driver and displays a selected shift position (including the P position). Alternatively, the indicator 40 may display an actual state of the shift position of the automatic transmission 20. In the manual operating device 30 of the present embodiment, when an external force is released, the shift lever 32 and the parking switch 34 are returned to their initial positions. Accordingly, when the shift lever 32 and the parking switch 34 are merely viewed, a selected shift position cannot be recognized. On this account, it is useful to provide such an indicator 40.

Figure 2:
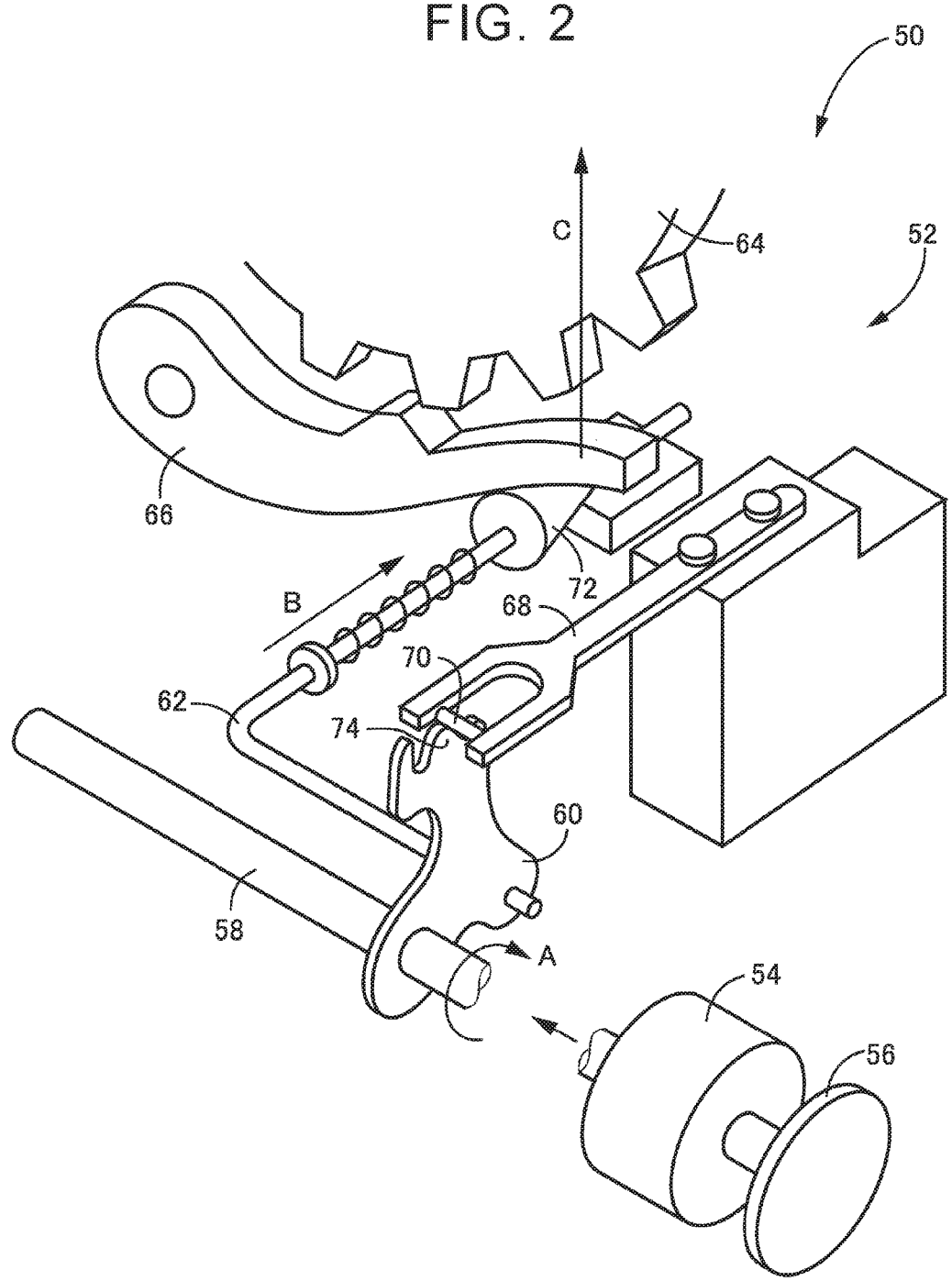
FIG. 2 is a perspective view illustrating one example of a change mechanism.

FIG. 2 is a perspective view to describe a configuration of the change mechanism 50. The change mechanism 50 changes the shift position of the automatic transmission 20 by an operation of an electric actuator. More specifically, in FIG. 2, the change mechanism 50 includes a parking lock mechanism 52, a motor 54 as an electric actuator, an encoder 56, and so on. The change mechanism 50 is a parking lock device that mechanically prevents rotation of the output gear 22 (used herein in the same meaning as the driving wheels 14) of the automatic transmission 20. Further, the change mechanism 50 prevents movement of the vehicle 10 as the P lock state or permits movement of the vehicle 10 by releasing the P lock state, based on a control signal from the after-mentioned electronic control unit 90.

The motor 54 is a switched reluctance motor (SR motor), for example, and drives the parking lock mechanism 52 in response to a command (a control signal) received from the after-mentioned electronic control unit 90. The encoder 56 is a rotary encoder, for example, and rotates integrally with the motor 54 so as to detect an operation state (a rotational state) of the motor 54 and supply, to the electronic control unit 90, a pulse signal Senc for acquiring a signal indicative of the rotational state, that is, an encoder count, which is a discrete value (a count) corresponding to a rotation amount as a working amount of the motor 54.

The parking lock mechanism 52 includes: a shaft 58 rotationally driven by the motor 54; a detent plate 60 rotating along with rotation of the shaft 58; a rod 62 working along with rotation of the detent plate 60; a parking gear (hereinafter referred to as a P gear) 64 fixed coaxially with the output gear 22 of the automatic transmission 20 (see FIG. 1) so as to rotate together with the driving wheels 14; a lock pole 66 engageable with the P gear 64; a spring 68 that restricts rotation of the detent plate 60; a roller 70 provided in a tip end of the spring 68 on the detent plate 60 side; a taper member 72 provided in a tip end of the rod 62 on the lock pole 66 side; and so on.

The detent plate 60 is connected to a driving shaft of the motor 54 via the shaft 58, and is driven by the motor 54 as well as the rod 62, the spring 68, the roller 70, and so on. The detent plate 60 is a P lock positioning member that changes the parking lock mechanism 52 between a P lock position corresponding to the P position and a non-P lock position corresponding to the non-P position (R, N, D, B position).

FIG. 2 illustrates a state where the parking lock mechanism 52 is positioned at the non-P lock position. The state illustrated in FIG. 2 is a non-locked state where a locked state where the lock pole 66 meshes with the P gear 64 is released, and therefore, the rotation of the driving wheels 14 is not prevented by the parking lock mechanism 52. When the shaft 58 is rotated by the motor 54 in a direction of an arrow A from the state illustrated in FIG. 2, the rod 62 is pushed via the detent plate 60 in a direction of an arrow B and the lock pole 66 is pushed up by the taper member 72 in a direction of an arrow C. When the detent plate 60 rotates so that the roller 70 placed in one valley (see a valley 76 illustrated in FIG. 3) out of two valleys (see valleys 76, 78 illustrated in FIG. 3) sandwiching a mountain 74 provided in an apex of the detent plate 60 climbs over the mountain 74 to reach the other valley (see the valley 78 illustrated in FIG. 3), the lock pole 66 is pushed up to a position where the lock pole 66 meshes with the P gear 64. Hereby, the rotation of the driving wheels 14 rotating in conjunction with the P gear 64 is prevented mechanically, and the parking lock mechanism 52 is positioned at the P lock position, so that the shift position of the automatic transmission 20 is set to the P position.

Figure 3:
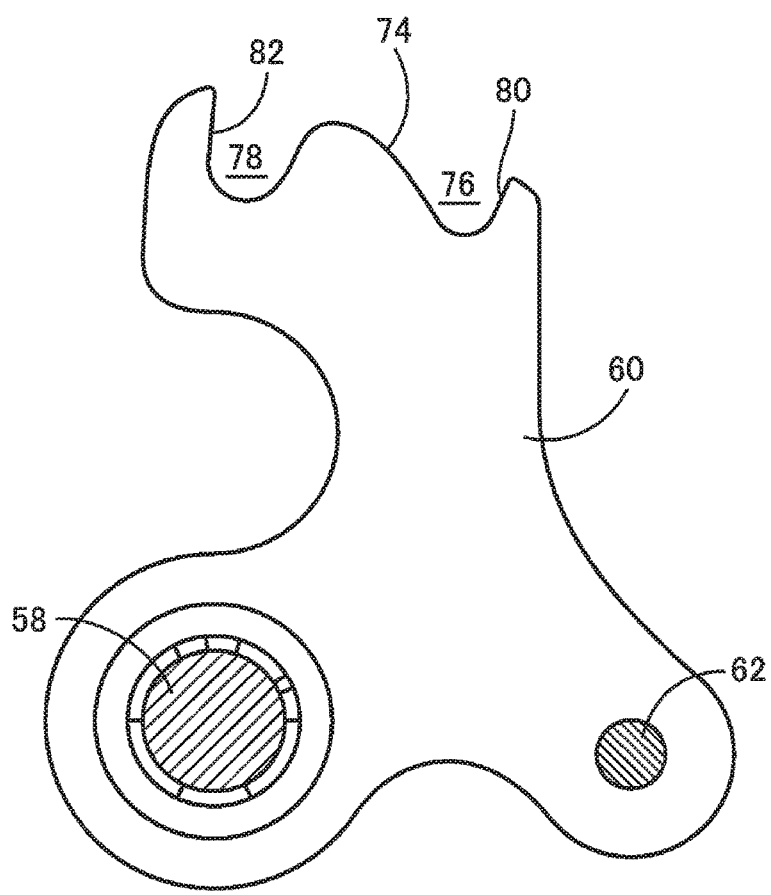
FIG. 3 is a view to describe a configuration of a detent plate.

FIG. 3 is a view to describe a configuration of the detent plate 60. In FIG. 3, in terms of each of the two valleys 76, 78 across the mountain 74, a surface placed on a side distanced from the mountain 74 is referred to as a wall. A wall in the valley 76 corresponding to the non-P lock position (the non-P position of the shift position) is a non-parking wall 80. A wall in the valley 78 corresponding to the P lock position (the P position of the shift position) is a parking wall 82. When the roller 70 moves from the valley 78 (the P lock position) to the valley 76 (the non-P lock position), the motor 54 is controlled by the after-mentioned electronic control unit 90 so that the non-parking wall 80 does not collide with the roller 70. More specifically, the rotation of the motor 54 is stopped by the electronic control unit 90 at a position (referred to as a non-P target rotation position, for example) before the non-parking wall 80 collides with the roller 70. Further, when the roller 70 moves from the valley 76 to the valley 78, the motor 54 is controlled by the electronic control unit 90 so that the parking wall 82 does not collide with the roller 70. More specifically, the rotation of the motor 54 is stopped by the electronic control unit 90 at a position (referred to as a P target rotation position, for example) before the parking wall 82 collides with the roller 70.

Figure 4:
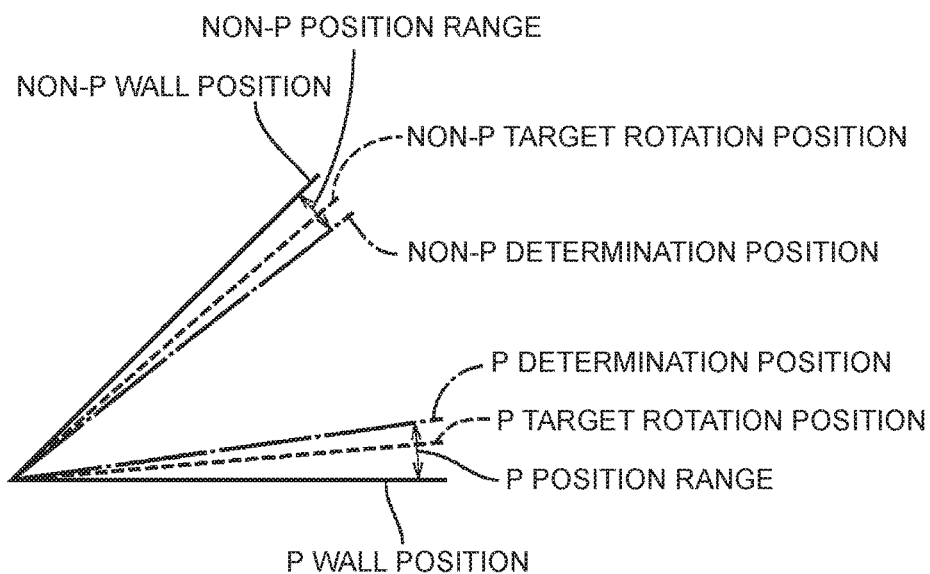
FIG. 4 is a view to describe a correspondence between a rotational amount of a motor and a shift position.

FIG. 4 is a view to describe a correspondence between the rotational amount (the encoder count) of the motor 54 and the shift position of the automatic transmission 20. The motor 54 rotationally drives the detent plate 60, and a rotation position (also referred to as a motor rotation position) as an operation position of the motor 54 is restricted by the non-parking wall 80 and the parking wall 82. In FIG. 4, a position (a P wall position) of the parking wall 82 and a position (a non-P wall position) of the non-parking wall 80 at the time of rotationally controlling the motor 54 are illustrated conceptually. Further, a P determination position and a non-P determination position illustrated in FIG. 4 are both predetermined positions of the detent plate 60 at which the change of the shift position of the automatic transmission 20 is determined. That is, a range from the P determination position to the P wall position is a P position range, and a range from the non-P determination position to the non-P wall position is a non-P position range. When the rotational amount of the motor 54, detected by the encoder 56, falls within the P position range, it is determined that the shift position is placed at the P position. In the meantime, when the rotational amount of the motor 54 falls within the non-P position range, it is determined that the shift position is placed at the non-P position. Note that, when the rotational amount of the motor 54 is positioned between the P determination position and the non-P determination position, it is determined that the shift position is unsettled or the shift position is in the middle of changing. The determination is performed by the after-mentioned electronic control unit 90.

Further, as illustrated in FIG. 4, the P target rotation position is set within the P position range, and the non-P target rotation position is set within the non-P position range. The P target rotation position is a position at which the parking wall 82 does not collide with the roller 70 at the time of changing from the non-P position to the P position, and is determined with a predetermined margin from the P wall position. Similarly, the non-P target rotation position is a position at which the non-parking wall 80 does not collide with the roller 70 at the time of changing from the P position to the non-P position, and is determined with a predetermined margin from the non-P wall position. Note that it is not necessary that the predetermined margin from the P wall position be equal to the predetermined margin from the non-P wall position, and they may vary depending on a shape of the detent plate 60, and the like.

In the change mechanism 50 configured as such, an encoder count corresponding to the rotational amount of the motor 54 is acquired by the after-mentioned electronic control unit 90 based on the pulse signal Senc output from the encoder 56, so that a motor rotation position is determined. However, since the encoder 56 is a relative position sensor, a reference position of the motor 54 is set, and a motor rotation position to become an absolute position of the motor 54 is determined based on an encoder count from the reference position. For example, the P wall position and the non-P wall position are detected by the electronic control unit 90, and the reference position is set.

Referring back to FIG. 1, the vehicle 10 includes the electronic control unit 90 including a control device for the vehicle 10, configured to control the change of the shift position of the automatic transmission 20, and the like, for example. The electronic control unit 90 is constituted by a so-called microcomputer including a CPU, a RAM, a ROM, an input-output interface, and so on, and the CPU uses a temporary memory function of the RAM and performs signal processing according to a program stored in the ROM in advance, so as to execute various controls on the vehicle 10. For example, the electronic control unit 90 is configured to execute an output control of the engine 12, a speed control of the automatic transmission 20, a change control of the shift position of the automatic transmission 20 by the change mechanism 50, and the like, and the electronic control unit 90 is configured in a separated manner for an engine output control, for a speed control, and the like, as needed.

Various signals are supplied to the electronic control unit 90 based on detection values from various sensors and the like (e.g., the parking switch 34, the shift sensor 36 and the select sensor 38, an engine rotation speed sensor 41, an output rotation speed sensor 42, an accelerator opening sensor 43, a brake switch 44, a battery sensor 45, the encoder 56, and so on) provided in the vehicle 10. The various signals include the following, for example: a P switch signal Spsw corresponding to the parking switch-on position Psw; the lever position signal Splev corresponding to the lever position Plev; an engine rotation speed Ne, which is a rotation speed of the engine 12; an output rotation speed No, which is a rotation speed of the output gear 22 corresponding to a vehicle speed V; an accelerator opening degree θacc, which is an operation amount of an accelerator pedal; a brake-on Bon, which is a signal indicative of a brake operation state in which a brake operation member for operating a wheel brake is operated by the driver; a battery voltage Vbat, which is a voltage of a battery 46 provided in the vehicle 10; a pulse signal Senc to acquire an encoder count corresponding to a motor rotation position as a position signal in the change mechanism 50; and the like signals. Further, the electronic control unit 90 outputs various command signals to various devices (e.g., the engine 12, the automatic transmission 20, the indicator 40, a starter 48 serving as an electric starting device that cranks the engine 12 at the time of an engine start, the change mechanism 50 (the motor 54), and so on) provided in the vehicle 10. The various command signals include the following, for example: an engine control command signal Seng for the output control of the engine 12; a speed control command signal Sshift for the speed control of the automatic transmission 20; a shift position change control command signal Spos to change the shift position (particularly, the non-P position) of the automatic transmission 20; a shift position indication signal Sindi to indicate the shift position (including the P position) of the automatic transmission 20; a cranking control command signal Scr to crank the engine 12; a P change control command signal Splock for the change control on the change mechanism 50; and the like signals.

In order to realize a control function for various controls in the vehicle 10, the electronic control unit 90 includes engine control means, that is, an engine control portion 92, and change control means, that is, a change control portion 94.

The engine control portion 92 calculates a requested driving force Fdem by applying the accelerator opening degree θacc and the vehicle speed V (the same meaning as an output rotation speed No, and the like) to a relationship (e.g., a driving force map) found and stored in advance (determined in advance) by experiment or on a design basis, for example. The engine control portion 92 sets a target engine torque Tetgt that provides the requested driving force Fdem, in consideration of a transmission loss, an accessory load, a gear ratio γ of the automatic transmission 20, and the like, and outputs the engine control command signal Seng for performing the output control on the engine 12 to a throttle actuator, a fuel injection device, an ignition device, and the like, so as to obtain the target engine torque Tetgt.

Further, in order to improve fuel efficiency, for example, the engine control portion 92 executes, based on a predetermined engine stop condition, an automatic stop and restart control (hereinafter referred to as an idle reduction control) of the engine 12 to temporarily stop the engine 12 automatically without a user operation and then restart the engine 12 automatically. More specifically, when a predetermined engine stop condition to execute the idle reduction control is established, the engine control portion 92 outputs an engine temporary stop command to a fuel injection device and the like so as to temporarily stop the engine 12 automatically by executing a fuel cut control of stopping fueling to the engine 12, and the like, and thus, the idle reduction control is started. When the predetermined engine stop condition is released during the idle reduction control, the engine control portion 92 outputs, to the fuel injection device and the like, an engine restart command to restart the engine 12 automatically by executing the cranking of the engine 12 by the starter 48, an opening/closing control of the electronic throttle valve, a fueling control, an ignition timing control, and the like, and thus, the idle reduction control is released. The predetermined engine stop condition is, for example, as follows: a vehicle stop (or a vehicle deceleration at a low vehicle speed) during which the vehicle speed V is determined to be zero is made, an accelerator is turned off, and the engine 12 has been warmed up, and further, a brake operation signal Bon is output (particularly, at the time of the D position).

Further, in a case where the operation position in the manual operating device 30 is operated to the non-P operation position at the time when the engine 12 stops at the P position of the automatic transmission 20, for example, the engine control portion 92 starts the engine 12 by cranking by the starter 48 under a predetermined condition. The non-P operation position includes the R operation position, the N operation position, the D operation position, and the B operation position, as described above. In the meantime, it is considered that the operation to the N operation position at the P position is not positively intended to start the vehicle. On that account, it is desirable that the operation to the non-P operation position, which starts the engine 12, be an operation to a travel operation position that is considered to be intended to start the vehicle. However, the B position of the automatic transmission 20, corresponding to the B operation position among the travel operation positions (the R operation position, the D operation position, and the B operation position) is an engine brake position on the premise of forward traveling at the D position. In view of this, it is considered that the operation to the B operation position is not intended to start the vehicle. Alternatively, it is also considered that it is not necessary to change to the B position in the operation to the B operation position at the P position. On that account it is desirable that the operation to the travel operation position (the non-P operation position), which starts the engine 12, does not include the operation to the B operation position. Note that the predetermined condition is a condition in which a vehicle stop, during which the vehicle speed V is determined zero, is made and the brake operation signal Bon is output, and the like condition.

In the meantime, there is also such a thought that the automatic start of the engine 12 by the operation to the non-P operation position without an engine starting operation (e.g., the operation of the engine starting switch) by the driver should be limited to a time when the engine 12 is temporarily stopped automatically by the idle reduction control. On that account, the stop of the engine 12 at the P position of the automatic transmission 20, during which the engine 12 is started by the operation to the non-P operation position, may be limited to a stop of the engine 12 by the idle reduction control at the P position of the automatic transmission 20.

The change control portion 94 electrically changes the shift position of the automatic transmission 20 by the change mechanism 50 based on the operation position in the manual operating device 30. More specifically, the change control portion 94 sets a request position, which is a desired shift position of the automatic transmission 20 by the driver, based on the lever position signal Splev and the parking switch signal Spsw. The change control portion 94 performs a change of the automatic transmission 20 to a shift position corresponding to the request position. More specifically, the change control portion 94 acquires an encoder count based on the pulse signal Senc output from the encoder 56 and determines a motor rotation position. Based on the motor rotation position, the change control portion 94 determines whether the parking lock mechanism 52 is positioned at the P lock position or at the non-P lock position (that is, the change control portion 94 determines whether the shift position of the automatic transmission 20 is positioned at the P position or at the non-P position). In a case where the P position is set as the request position due to the operation to the P operation position at the time when the shift position is positioned at the non-P position, the change control portion 94 operates the motor 54 to set the parking lock mechanism 52 to the P lock position, so that the shift position of the automatic transmission 20 is changed from the non-P position to the P position. Meanwhile, in a case where an operation to the non-P operation position (e.g., any one of the R, N, D operation positions) is performed at the time when the shift position is positioned at the P position, and the non-P position corresponding to the non-P operation position is set as the request position, the change control portion 94 operates the motor 54 to set the parking lock mechanism 52 to the non-P lock position, so that the shift position of the automatic transmission 20 is changed from the P position to the non-P position and is changed to a shift position corresponding to the request position among the R position, the N position, and the D position.

At the time when the shift position of the automatic transmission 20 is changed, the change control portion 94 controls the motor 54 so that the acquired encoder count reaches a target count (a target discrete value) as a predetermined target working amount. The target count is a count (a working amount) corresponding to the target rotation position (that is, the P target rotation position or the non-P target rotation position) as a target working position of the motor 54 after the change of the shift position, for example, and is a target value found in advance to stop the motor 54 at the target rotation position.

At the time when the shift position of the automatic transmission 20 is changed, it is desirable that a response of the change be secured and the motor 54 be stopped precisely at the target rotation position so as not to overshoot the target rotation position of the motor 54 after the change. On that account, the motor 54 is decelerated when the motor rotation position nears the target rotation position after the change. More specifically, as a value to determine a deceleration start position, which is a rotation position at which the deceleration of the motor 54 is started, a remaining count (also referred to as a target remaining count) to the target count is determined in advance. In a case where the shift position of the automatic transmission 20 is changed, when the encoder count reaches a deceleration start count (="target count"-"target remaining count"), which is a value obtained by subtracting the target remaining count from the target count, the change control portion 94 starts to decelerate the motor 54 so as to stop the motor 54 at the target count.

In the meantime, in a case where an applied voltage (hereinafter referred to as a motor voltage) to the motor 54, which is a voltage applied to the motor 54, is low, a motor torque is set to be smaller than a case where the motor voltage is high. As a result, in a case where the motor voltage is low, a decelerating torque to decelerate the motor 54 is relatively lowered, so that it is hard to decelerate the motor 54. On that account, in terms of the change of the shift position of the automatic transmission 20, in a case where the motor voltage is low, it is desirable to decelerate the motor 54 earlier than in a case where the motor voltage is high (that is, the deceleration start position is set to a side closer to the target rotation position of the motor 54 before the change). That is, in the case where the motor voltage is low, the target remaining count is set to a relatively large value. Hereby, even in the case where the motor voltage is low, it is possible to precisely stop the motor 54 at the target rotation position so as not to overshoot the target rotation position of the motor 54 after the change.

Figure 5:
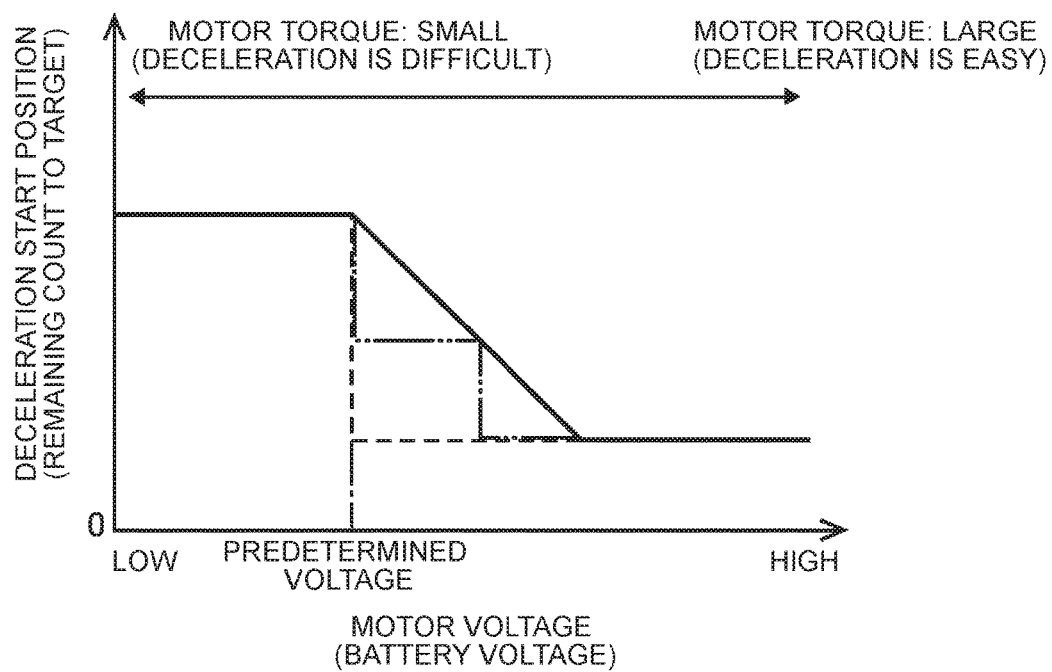
FIG. 5 is a view illustrating one example of a target remaining count map to calculate a target remaining count for a motor voltage, the target remaining count map being used for changing of the shift position.

More specifically, the electronic control unit 90 has a relationship (e.g., a map, also referred to as a target remaining count map) as illustrated in FIG. 5, the relationship being determined in advance so that the target remaining count to determine the deceleration start position is larger in a case where the motor voltage is lower than a predetermined voltage, as compared to a case where the motor voltage is higher than the predetermined voltage. The predetermined voltage is a predetermined threshold for determining that the motor 54 has a low motor voltage at which the motor 54 is desired to be decelerated earlier because the deceleration of the motor 54 becomes difficult. Accordingly, the target remaining count is a predetermined value in association with a motor voltage so as to balance the response of the change of the shift position and stopping performance of the motor 54 at the target rotation position. The target remaining count map may be, for example, a map in which the target remaining count is increased gradually from a high voltage side to a low voltage side of the motor voltage, as indicated by a continuous line in FIG. 5, a map in which the target remaining count is set at two stages across a predetermined voltage, as indicated by a broken line in FIG. 5, or a map in which the target remaining count is set at three or more stages across the predetermined voltage and a voltage higher than the predetermined voltage, as indicated by an alternate long and two short dashes line in FIG. 5. Note that, as the motor voltage, a voltage value obtained by directly detecting a voltage applied to the motor 54 is used. Alternatively, since a battery voltage Vbat is applied to the motor 54 in the vehicle 10, the battery voltage Vbat may be used as the motor voltage. In this case, the motor voltage may be determined in consideration of a voltage drop due to a wire harness from the battery 46 to the motor 54, and the like, for example.

At the time of changing the shift position of the automatic transmission 20, the change control portion 94 operates the motor 54 by use of the target remaining count map as illustrated in FIG. 5. At the time when the shift position of the automatic transmission 20 is changed, the change control portion 94 calculates a target remaining count corresponding to the motor voltage, and when the encoder count reaches a deceleration start count, the change control portion 94 starts deceleration of the motor 54.

Here, in the vehicle 10, at the time when the engine 12 stops at the P position of the automatic transmission 20 (particularly, at the time of an engine stop by the idle reduction control), when the shift lever 32 is operated by the driver to the non-P operation position (particularly, the R operation position or the D operation position), the electronic control unit simultaneously executes two controls, i.e., a start control of the engine 12 (that is, cranking by the starter 48), and a change control of the shift position from the P position to the non-P position (that is, release of the P locked state by the operation of the motor 54). In such a case, since the voltage is also applied to the starter 48 by the battery 46 that applies the voltage to the motor 54, contradicting phenomena, i.e., a decrease of the battery voltage Vbat at the time of cranking and securing of a working voltage of the motor 54 occur. As a result, the motor 54 might not be operated in a similar manner to the time when the battery voltage Vbat does not decrease. For example, in a case where the battery voltage Vbat decreases after the operation start of the motor 54, if the deceleration start position corresponding to the target remaining count for the decreased battery voltage Vbat has been already passed, it is difficult to precisely stop the motor 54 at the target rotation position after the change by the decelerating torque of the motor 54 by the decreased battery voltage Vbat. Accordingly, there might occur an overshoot (particularly, a collision between the roller 70 and the non-parking wall 80) in which the motor 54 overshoots the target rotation position. It is considered that such a problem occurs conspicuously at the time of using a motor without a cogging torque, such as a SR motor like the motor 54 (that is, a motor in which a force to damp an inertia force of the rotor disappears or decreases when the motor voltage becomes zero or decreases). In order to avoid the occurrence of the overshoot, it is conceivable that two controls are performed with a time difference, that is, the release of the P locked state is delayed until the starting of the engine 12 is completed or the start control on the engine 12 is started after the release of the P locked state is completed. However, when a time from the operation by the driver to the R operation position or to the D operation position to the completion of the engine starting is extended, there might occur a demerit such as a feeling of delay of the vehicle start.

In view of this, when the operation to the non-P operation position (particularly, the R operation position or the D operation position) is performed at the time when the engine 12 stops at the P position of the automatic transmission 20 (particularly, at the time when the engine 12 stops by the idle reduction control), the deceleration start timing of the motor 54 operated so as to change the automatic transmission 20 from the P position to the non-P position is made earlier by the change control portion 94 in comparison with a case where the operation is performed at a different time from the time when the engine 12 stops at the P position. That is, in a case where the start control (cranking) of the engine 12 is performed at the time when the operation to the non-P operation position is performed at the P position, the deceleration start timing of the motor 54 operated so as to change the automatic transmission 20 from the P position to the non-P position is made earlier by the change control portion 94 in comparison with a case where the start control of the engine 12 is not performed.

More specifically, regardless of the motor voltage, the change control portion 94 operates the motor 54 by use of a target remaining count at the time when the motor voltage in the target remaining count map as illustrated in FIG. 5 is lower than the predetermined voltage, so that the deceleration start timing of the motor 54 operated so as to change the automatic transmission 20 from the P position to the non-P position is made earlier. As such, in the present embodiment, in a case where the engine stop is made at the P position by the idle reduction control (also referred to as eco-run), the target remaining count (a map value) in the target remaining count map as illustrated in FIG. 5 that is adapted to change the shift position appropriately in a state of a low motor voltage (the same meaning as the battery voltage Vbat) is selected in advance, so as to be used for the change control to the non-P position. Hereby, even in a state where the battery voltage Vbat is decreased due to subsequent cranking by the starter 48, the release of the P locked state by the motor 54 can be executed appropriately. Further, even if the motor voltage decreases during a control in which two controls, i.e., the start control of the engine 12 and the change control from the P position to the non-P position are performed simultaneously, the change control to the non-P position is executed appropriately without the overshoot. Note that, when a map value for a low motor voltage is used in advance, an upper limit of the motor rotation speed is restrained, so that a change time from the P position to the non-P position is extended. However, since a time for the engine start control to be executed at the same time is longer than the change time, there is no influence on start delay or the influence is extremely low.

The electronic control unit 90 further includes controlled state determination means, that is, a controlled state determination portion 96 so as to realize a control to make the deceleration start timing of the motor 54 earlier as described above.

The controlled state determination portion 96 determines whether a motor stop state where the motor 54 is stopping is established or not (that is, a state where the shift position of the automatic transmission 20 is not in the middle of changing and the motor 54 does not drive the parking lock mechanism 52 is established or not).

The controlled state determination portion 96 determines whether an engine stop state where the engine 12 is stopping due to the idle reduction control by the engine control portion 92 is established or not (that is, whether the engine is stopping due to eco-run or not).

The controlled state determination portion 96 determines whether the shift position of the automatic transmission 20 is positioned at the P position or not.

When the controlled state determination portion 96 determines that the motor is stopping, the engine is stopping due to eco-run, and the automatic transmission 20 is placed at the P position, the change control portion 94 reads out a target remaining count (a map value) at a motor voltage lower than the predetermined voltage in the target remaining count map illustrated in FIG. 5, regardless of the motor voltage. That is, in preparation for a drop of the battery voltage Vbat due to return (engine restart) from eco-run, a control value for early deceleration start of the motor 54 (that is, for motor rotation speed restraint) is read.

Meanwhile, when the controlled state determination portion 96 determines that the motor is stopping, and the engine is not stopping due to eco-run or the automatic transmission 20 is not placed at the P position, the change control portion 94 reads out a target remaining count (a map value) corresponding to the motor voltage by use of the target remaining count map illustrated in FIG. 5. That is, a control value that puts importance on a change response of the shift position in comparison with the control value for motor rotation speed restraint is read.

Figure 6:
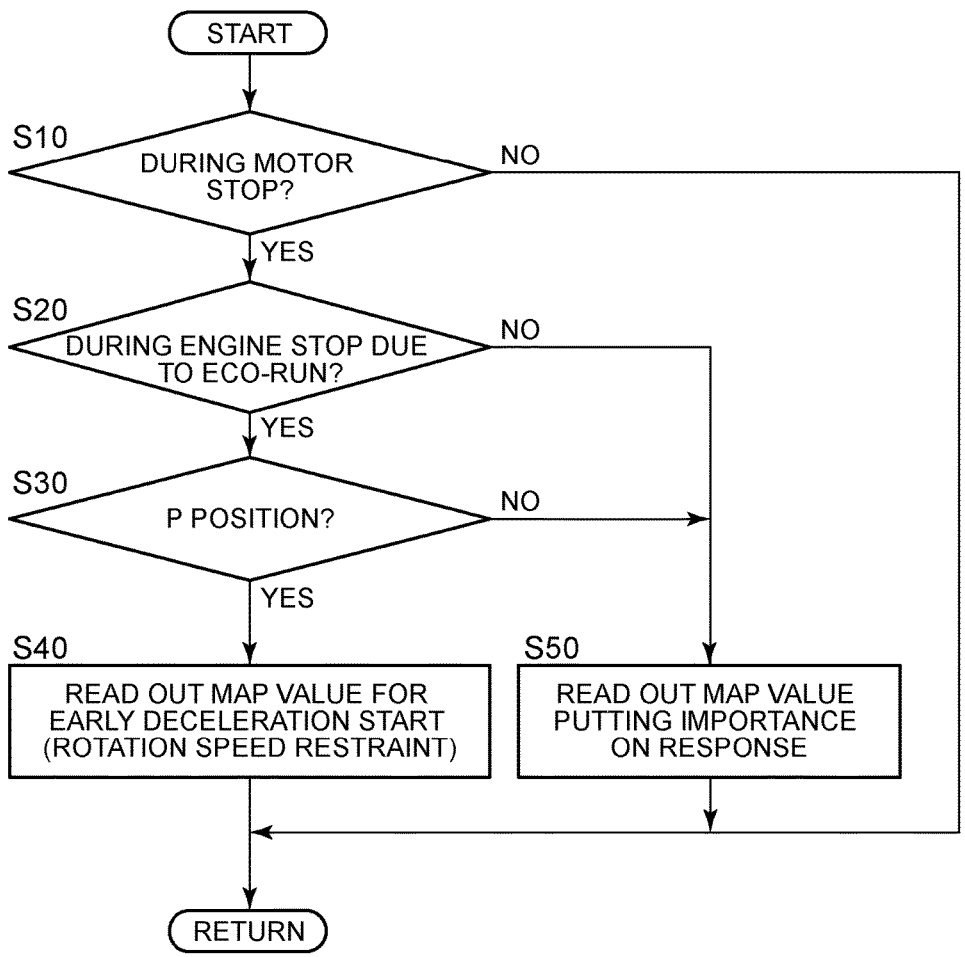
FIG. 6 is a flowchart to describe an essential part of a control operation of an electronic control unit, that is, a control operation to secure responses of controls to an operation to a non-parking operation position by a driver by simultaneously executing changing to a non-parking position and starting of an engine and to restrain an overshoot of a motor with respect to a non-parking target rotation position.

FIG. 6 is a flowchart to describe an essential part of the control operation of the electronic control unit 90, that is, a control operation at the time when two controls, i.e., the change of the automatic transmission 20 to the non-P position and the starting of the engine 12, are executed simultaneously, and the control operation is executed repeatedly, for example. FIG. 7 is a view illustrating one example of a time chart when the control operation illustrated in the flowchart of FIG. 6 is executed.

In FIG. 6, first, in step S10 (hereinafter "step" is omitted) corresponding to a function of the controlled state determination portion 96, it is determined whether the motor is stopping (the motor 54 is stopping) or not. When the determination in S10 is disaffirmed, this routine is finished. When the determination in S10 is affirmed, it is determined whether the engine is stopping due to the idle reduction control (eco-run) or not, in S20 corresponding to the function of the controlled state determination portion 96. When the determination in S20 is affirmed, it is determined whether the shift position of the automatic transmission 20 is positioned at the P position or not, in S30 corresponding to the function of the controlled state determination portion 96. When the determination in S30 is affirmed, a map value for early deceleration start of the motor 54 (for motor rotation speed restraint) as illustrated in FIG. 5 is read out regardless of the motor voltage, in S40 corresponding to a function of the change control portion 94. The map value for early deceleration start of the motor 54 is a target remaining count at a motor voltage lower than the predetermined voltage in the target remaining count map. When the determination in S20 is disaffirmed or when the determination in S30 is disaffirmed, a map value that puts importance on the change response of the shift position as illustrated in FIG. 5 is read out in S50 corresponding to the function of the change control portion 94. The map value that puts importance on the change response of the shift position is a target remaining count for a motor voltage by use of the target remaining count map.

FIG. 7 illustrates one example of an embodiment (see the present embodiment, Comparative Example A) in a case where the release of the P locked state and the restart of the engine 12 (the release of the engine stop due to eco-run) are executed simultaneously when the operation to the non-P operation position is performed by the driver during the stop of the engine 12 at the P position, and one example of an embodiment (see Comparative Example B) in a case where the release of the P locked state is performed without the starting of the engine 12. In FIG. 7, a time point t1 indicates that the change control from the P position to the non-P position is started and the operation of the motor 54 is started. A time point t2 indicates that the restart of the engine 12 is started. In Comparative Example B indicated by an alternate long and two short dashes line, deceleration of the motor 54 is performed based on a target remaining count that puts importance on a response. In Comparative Example B in which the starting of the engine 12 is not executed, the battery voltage Vbat does not decrease, so a decelerating torque of the motor 54 is obtained sufficiently and a motor rotation speed is reduced immediately. Hereby, the motor rotation position reaches the non-P target rotation position immediately without overshooting, and the change to the non-P position is finished immediately. Meanwhile, similarly to Comparative Example B, in Comparative Example A indicated by a broken line, deceleration of the motor 54 is performed based on the target remaining count that puts importance on the response, so that the motor rotation speed is decreased. In Comparative Example A where the restart of the engine 12 is executed during the decrease of the motor rotation speed, a decelerating torque of the motor 54 is decreased along with a decrease of the battery voltage Vbat, and therefore, the decrease of the motor rotation speed is delayed (see after the time point t2). On that account, the motor rotation position overshoots the non-P target rotation position, so that the roller 70 collides with the non-parking wall 80. In Comparative Example A, the target remaining count that puts importance on the response is used, but since the engine starting is performed simultaneously, a completion of the change to the non-P position is delayed consequently. In this regard, in the present embodiment indicated by a continuous line, in preparation for the decrease of the battery voltage Vbat due to the engine restart, deceleration of the motor 54 is performed while the battery voltage Vbat is high, based on the target remaining count that puts importance on restraint of the rotation speed of the motor 54, so that the motor rotation speed is decreased early. Hereby, even if the battery voltage Vbat is decreased, it is possible to perform the deceleration appropriately when the motor rotation position nears the non-P target rotation position, so that the occurrence of the overshoot is avoided or restrained (see after the time point t2).

As described above, according to the present embodiment, in a case where the operation to the non-P operation position is performed at the time of the stop of the engine 12 at the P position of the automatic transmission 20, two controls, i.e., the change of the automatic transmission 20 from the P position to the non-P position and the starting of the engine 12, are executed simultaneously. At this time, in a case where the operation to the non-P operation position is performed at the time when the engine 12 stops at the P position, the deceleration start timing of the motor 54 operated so as to change the automatic transmission 20 from the P position to the non-P position is made earlier in comparison with a case where the operation is performed at a different time from the time when the engine 12 stops at the P position. Accordingly, even if the motor voltage is decreased, the motor rotation position can be easily stopped at the non-P target rotation position, which is the target rotation position after the change of the shift position. Thus, it is possible to secure the responses of two controls to the operation to the non-P operation position by the driver by simultaneously executing the two controls, i.e., the change of the automatic transmission 20 to the non-P position and the starting of the engine 12, and it is also possible to restrain an overshoot of the motor 54 with respect to the target rotation position.

Further, in the present embodiment, in a case where the operation to the non-P operation position is performed at the time when the engine 12 stops at the P position, the motor 54 is operated by use of an increased target remaining count at the time when the motor voltage is lower than the predetermined voltage, regardless of the motor voltage, so that the deceleration start timing of the motor 54 operated so as to change the automatic transmission 20 to the non-P position is made earlier. Accordingly, even in a state where the motor voltage is decreased, the motor rotation position can be easily stopped at the non-P target rotation position appropriately.

Further, in the present embodiment, the operation to the non-P operation position, which starts the engine 12, is an operation to the travel operation position (the R operation position or the D operation position). Accordingly, it is possible to secure the responses of two controls to the operation to the travel operation position by the driver by simultaneously executing the two controls, i.e., the change of the automatic transmission 20 to the travel position and the starting of the engine 12, and it is also possible to restrain an overshoot of the motor 54 with respect to the target rotation position. A start response can be secured, for example, by securing the responses of the two controls.

Further, in the present embodiment, the stop of the engine 12 at the P position, during which the engine 12 is started by the operation to the non-P operation position, is a stop of the engine 12 at the P position due to the idle reduction control. Accordingly, in a case where the engine 12 is temporarily stopped at the P position due to the idle reduction control, the starting of the engine 12 is executed by the operation to the non-P operation position.

The embodiment of the present disclosure has been described in detail with reference to the attached drawings, but the present disclosure is also applied to the other aspects.

For example, in the above embodiment, the target remaining count is calculated by use of the target remaining count map as illustrated in FIG. 5, and the deceleration start position is determined based on the target remaining count.

However, the present disclosure is not limited to this aspect. For example, instead of the map, the deceleration start position may be determined based on a target remaining count at each time when the motor voltage is lower or higher than the predetermined voltage, as a predetermined relationship. Alternatively, a time from an operation start of the motor 54 to a deceleration start thereof may be determined in advance in association with the motor voltage, and the deceleration start position may be determined based on the time.

Further, in the above embodiment, the working amount of the motor 54 is expressed as the encoder count, but the present disclosure is not limited to this aspect. For example, it is not necessary to acquire the working amount of the motor 54 in the form of the rotational amount, but the working amount may be expressed as a moving amount of the rod 62 of the parking lock mechanism 52 driven by the motor 54, and the like. The electric actuator for driving the parking lock mechanism 52 may be configured to drive the parking lock mechanism 52 without a rotational operation, and needless to say, in such a case, the working amount and the operation position of the electric actuator are not expressed by the rotational amount (encoder count) and the rotation position.

Further, in the above embodiment, the manual operating device 30 includes two operators, i.e., the shift lever 32 and the parking switch 34. However, the present disclosure is not limited to this aspect. For example, the manual operating device may be a manual operating device including operation positions of P, R, N, D, etc., corresponding to respective shift positions of the automatic transmission 20, one operator such as a lever or a dial to be operated to the operation positions, and a position sensor for electrically detecting that the operator is operated to each operation position. Alternatively, the operators may not be momentary-type operators.

Further, in the above embodiment, the change mechanism 50 changes between the P lock state (the P lock position) and a state (the non-P lock position) where the P lock is released in conjunction with the rotating operation of the detent plate 60. However, the present disclosure is not limited to this aspect. For example, the change mechanism may be a change mechanism configured to change between the P lock position corresponding to the P position and a plurality of non-P lock positions corresponding to the respective non-P positions such as R, N, D positions.

Further, in the above embodiment, the operation to the non-P operation position, which starts the engine 12, is an operation to the travel operation position (the R operation position or the D operation position). However, the present disclosure is not limited to this aspect. For example, if the securing of the start response is not considered, the operation to the non-P operation position, which starts the engine 12, may include the operation to the N operation position.

Further, in the above embodiment, in a case where the engine 12 is started at the time when the operation to the non-P operation position is performed, the engine is stopping at the P position due to eco-run. However, the present disclosure is not limited to this aspect. For example, from the viewpoint of securing the responses of the two controls (the change to the non-P position and the starting of the engine 12) to the operation to the non-P operation position and restraining an overshoot of the motor 54 with respect to the target rotation position, the engine may not be stopping at the P position due to eco-run, but the engine may be just stopping at the P position. In this case, in S20 in the flowchart of FIG. 6, it is determined whether the engine is just stopping or not. Further, the timing to set the target remaining count for early deceleration start of the motor 54 (for motor rotation speed restraint) at the motor voltage lower than the predetermined voltage may be during the motor stop as illustrated in the flowchart of FIG. 6, but alternatively, the timing may be a time point at which the P operation position is changed to the non-P operation position, for example. In this case, in S10 in the flowchart of FIG. 6, it is determined whether or not the P operation position is changed to the non-P operation position, and S30 is not required. Thus, the flowchart of FIG. 6 can be modified appropriately.

Further, in the above embodiment, the automatic transmission 20 is a planetary-gear automatic transmission, a synchromesh parallel two-shaft transmission, a Dual Clutch Transmission (DCT), a continuously variable transmission, an electric continuously variable transmission, or the like, for example. Further, the vehicle 10 includes the engine 12 as a power source, but as the power source, other motors such as an electric motor can be employed in combination with the engine 12, for example. In a case where an electric motor is included as the power source or in a case where an electric motor is originally included like the electric continuously variable transmission, the engine 12 may be cranked by the electric motor. In such a case, the electric motor functions as an electric starting device. Accordingly, in such a case, the vehicle 10 may not necessarily include the starter 48.

Further, in the above embodiment, the P gear 64 is fixed coaxially with the output gear 22 of the automatic transmission 20. However, the present disclosure is not limited to this aspect. For example, if the P gear 64 has such a relationship that rotation of the driving wheels 14 (the same meaning as the output gear 22) is prevented when the P gear 64 meshes with the lock pole 66, a place where the P gear 64 is provided is not limited in particular.

These are merely one embodiment to the utmost, and the present disclosure can be performed in an aspect to which various changes and improvements are added based on the knowledge of a person skilled in the art.

What is claimed is:
1. A control device for a vehicle,
the vehicle including an engine, an automatic transmission, an operating device, a change mechanism, and an electric starting device,
the automatic transmission being configured to transmit a power of the engine to driving wheels,
the operating device including operators, the operators being configured to be operated by a driver to an operation position corresponding to a shift position of the automatic transmission,
the change mechanism being configured to change the shift position of the automatic transmission by an operation of an electric actuator,
the electric starting device being configured to start the engine by cranking,
the control device comprising:
an electronic control unit configured to electrically change the shift position of the automatic transmission by the change mechanism based on the operation position of the operators,
the electronic control unit being configured to start the engine by cranking by the electric starting device when the electronic control unit determines that the operators are operated by the driver to a non-parking operation position at a predetermined time, the predetermined time being a time when the shift position of the automatic transmission is set to a parking position and the engine stops, the parking position being the shift position of the automatic transmission, the shift position causing a parking lock state where rotation of an output rotational member of the automatic transmission is mechanically prevented by the change mechanism, the non-parking operation position being a position of the operator corresponding to a non-parking position of the automatic transmission, the non-parking position being the shift position of the automatic transmission at which the parking lock state is released, the electronic control unit being configured to control a deceleration start timing of the electric actuator such that the deceleration start timing of a first condition becomes earlier than the deceleration start timing of a second condition, the first condition being a condition under which the operator is operated by the driver to the non-parking operation position at the predetermined time, the second condition being a condition under which the operator is operated by the driver to the non-parking operation position at a time other than the predetermined time.

2. The control device for the vehicle, according to claim 1, wherein:

the electronic control unit is configured to operate the electric actuator by use of a predetermined relationship such that a first predetermined working amount is larger than a second predetermined working amount, the first predetermined working amount is a predetermined working amount at a time when a voltage applied to the electric actuator is lower than a predetermined voltage, the second predetermined working amount is a predetermined working amount at a time when the voltage applied to the electric actuator is higher than the predetermined voltage, the predetermined working amount being a remaining working amount to a working amount corresponding to a target operation position of the electric actuator after the shift position is changed, so as to determine an operation position to start deceleration of the electric actuator; and the electronic control unit is configured to operate the electric actuator by use of the predetermined working amount in the predetermined relationship such that the deceleration start timing of the electric actuator is made early when the electronic control unit determines that the voltage applied to the electric actuator is lower than the predetermined voltage.

3. The control device for the vehicle, according to claim 1, wherein the operation to the non-parking operation position is an operation to a travel operation position in which the shift position of the automatic transmission is set to a travel position, the travel position being the shift position of the automatic transmission, at which the power of the engine is transmitted to the driving wheels.

4. The control device for the vehicle, according to claim 1, wherein:

the electronic control unit is configured to execute an idle reduction control, the idle reduction control being a control to temporarily stop the engine based on a predetermined engine stop condition; and the predetermined time is a time when the engine stops due to the idle reduction control.

5. A control method for a vehicle, the vehicle including an engine, an automatic transmission, an operating device, a change mechanism, an electric starting device, and an electronic control unit, the automatic transmission being configured to transmit a power of the engine to driving wheels, the operating device including operators, the operators being configured to be operated by a driver to an operation position corresponding to a shift position of the automatic transmission, the change mechanism being configured to change the shift position of the automatic transmission by an operation of an electric actuator, the electric starting device being configured to start the engine by cranking, the control method comprising:

electrically changing, by the electronic control unit, the shift position of the automatic transmission based on the operation position of the operators;

starting, by the electronic control unit, the engine by cranking by the electric starting device when the electronic control unit determines that an operation to a non-parking operation position is performed by the driver at a predetermined time; and controlling, by the electronic control unit, a deceleration start timing of the electric actuator such that the deceleration start timing of a first condition becomes earlier than the deceleration start timing a second condition, the predetermined time being a time when the shift position of the automatic transmission is set to a parking position and the engine stops, the parking position being the shift position of the automatic transmission, the shift position causing a parking lock state where rotation of an output rotational member of the automatic transmission is mechanically prevented by the change mechanism, the non-parking operation position being a position of the operator corresponding to a non-parking position of the automatic transmission, the non-parking position being the shift position of the automatic transmission at which the parking lock state is released, the first condition being a condition under which the operator is operated by the driver to the non-parking operation position at the predetermined time, the second condition being a condition under which the operator is operated by the driver to the non-parking operation position at a time other than the predetermined time.

* * * * *